(No Model.)
W. L. ROSS.
SUPPORT FOR BICYCLES.
No. 468,920. Patented Feb. 16, 1892.
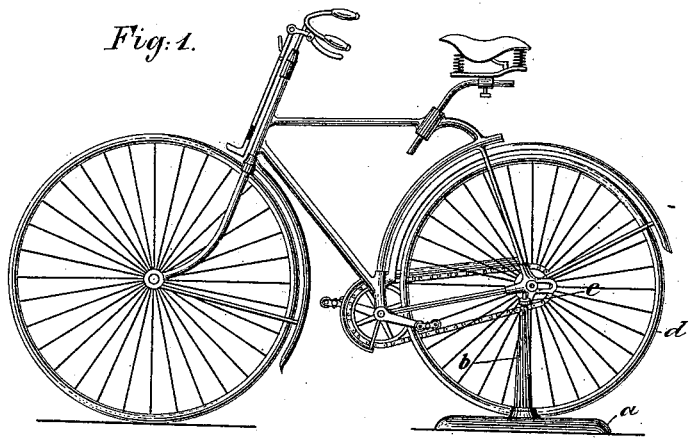
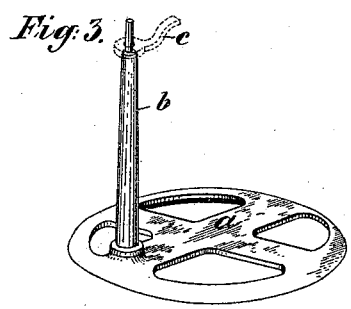
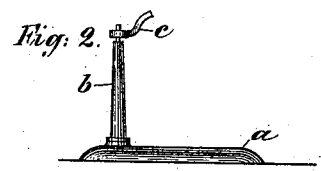
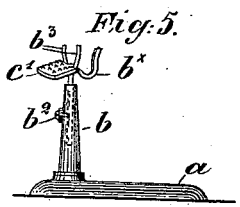
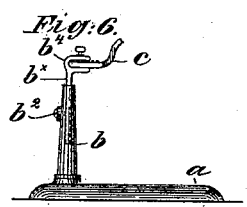
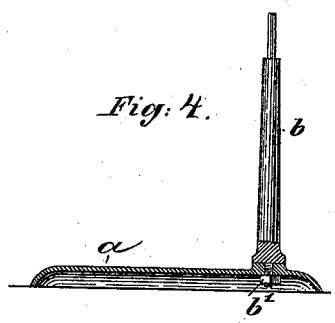
WITNESSES:
INVENTOR:
William L. Ross.
By Henry Connett
Attorney.

UNITED STATES PATENT OFFICE.

WILLIAM L. ROSS, OF BOSTON, MASSACHUSETTS.

SUPPORT FOR BICYCLES.

SPECIFICATION forming part of Letters Patent No. 468,920, dated February 16, 1892.

Application filed September 5, 1891. Serial No. 404,917. (No model.)

*To all whom it may concern:*

Be it known that I, WILLIAM L. ROSS, a citizen of the United States, and a resident of Boston, in the county of Suffolk and State of Massachusetts, have invented certain Improvements in Locking-Stands for Safety Bicycles, of which the following is a specification.

My invention relates to stands for bicycles adapted for holding the same in an erect position when not in use. The stands in common use for this purpose are made to grasp the wheel of the bicycle at its lower part, whereby the strain tending to topple the bicycle over is thrown on the spokes and rim of the wheel close to the ground, where the strain is applied with an immense advantage in leverage.

The object of my invention is to provide a stand for a Safety bicycle which shall have a plain flat base for the wheel to rest upon and an upright on said base provided with means at its top or upper part for locking it to the step on the frame of the bicycle in such a manner as to prevent movement of the latter in any direction—that is to say, so as to prevent the bicycle from being moved either backward or forward or sidewise. The strain being thus transferred to the frame of the Safety and the locking being effected at a point substantially at the level of the wheel-centers, the bicycle will be held firmly and cannot be injured by any accidental push or blow.

In the drawings which serve to illustrate my invention, Figure 1 is a view showing the application of my invention to a stand for a Singer Safety bicycle, for which it is especially well adapted, as the bicycle has a step in the form of a ring. Fig. 2 is a side view of the stand detached, on the same scale as Fig. 3. This view shows the step of the "Singer" in place on the upright of the stand. Fig. 3 is a perspective view of the stand on a larger scale than the preceding figures. Fig. 4 shows the base of the stand in section and illustrates a construction whereby the upright of the stand may be made removable for convenience in packing and shipping the stand. Figs. 5 and 6 illustrate other forms of the stand suitable for bicycles having steps of different forms.

The stand, as illustrated in Figs. 1, 2, 3, and 4, comprises a base $a$, which may have a plane upper surface for the wheel to rest on, as a concave groove to receive the rim of the wheel is not necessary in my stand. On the base $a$ is an upright $b$, which I prefer to make removable, as seen in Fig. 4—that is, I form a screw on its lower extremity which passes down through a hole in the base and receives a securing-nut $b'$.

The Singer Safety bicycle (seen in Fig. 1) has a step $c$ somewhat in the form of a ring—that is to say, it has in it an aperture or hole—and the upright $b$ is made of such length that when the wheel $d$ of the bicycle rests on the base $a$ of the stand the bicycle may be lifted a little and the upper extremity of the upright made to pass through the hole in said step, as represented. This engagement of the upright with the step locks the bicycle-frame to the stand in such a manner that the bicycle cannot be moved either forward or back or sidewise, as the step embraces the upright at all four of its sides.

The form of stand I have described is the simplest and the best adapted for the Singer Safety; but some modification is necessary to adapt my locking-stand to bicycles having other forms of steps. For example, in Fig. 5 I have shown the upright as constructed of two parts $b$ and $b^\times$, the latter telescoping with the former and thus providing for adjustment as to height, a set-screw $b^2$ being employed to secure the parts together when adjusted. On the upper extremity of the part $b^\times$ is a fork $b^3$, which is made to embrace the narrow part of the step $c'$ back of the broader tread of the same. This form of lock may be employed in any case where the step has a narrow portion or neck adapted to be embraced by the fork.

Fig. 6 shows a stand like that illustrated in Fig. 5, except that a screw-clamp $b^4$ is substituted for the fork $b^3$. This form of the lock may be used with any of the ordinary forms of steps.

I am aware that it is not new in stands for what are known as "ordinary" bicycles to employ a base for the stand with a concave groove therein to receive the wheel and a post on said base, the upper end of which has a rubber sleeve which takes between the crank and hub of the wheel at one side of the axle, and this I do not claim. My stand is for Safety bicycles, and the upper end of the upright is locked to some part of the frame, so that the bicycle cannot be moved in any direction until disengaged. As the step or projection from the frame to which the upright is to be locked or secured is not in all Safety bicycles in the same vertical plane as the wheel-hub, I prefer that the upper surface of the base $a$ shall be plane, so that the wheel may rest fairly on it at any point. This is also advantageous by reason of the fact that in some bicycles the step projects laterally farther than in others.

Having thus described my invention, I claim—

1. A stand for a Safety bicycle, comprising a base $a$ and an upright thereon adapted to be locked to the step or other similar part projecting from the frame of the bicycle, substantially as set forth.

2. A stand for a Safety bicycle, comprising a base $a$, with a substantially plane surface for the wheel to rest on, and an upright on said base provided with means for locking it to the step of the bicycle, substantially as set forth.

3. The combination, with a Safety bicycle having a step with an aperture therein, of a stand comprising a base for the wheel to rest upon and an upright on said base, the upper end of which is adapted to engage the aperture in said step when the wheel of the bicycle rests on said base, substantially as set forth.

In witness whereof I have hereunto signed my name in the presence of two subscribing witnesses.

WILLIAM L. ROSS.

Witnesses:
JOHN W. BADGER,
GEORGE H. FULLER.